G. W. Lewis,
Corn Planter.
No. 113,717.  Patented Apr. 11, 1871.
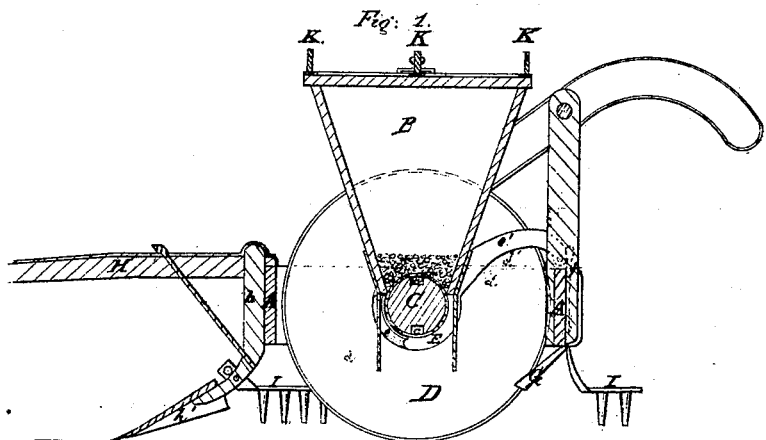
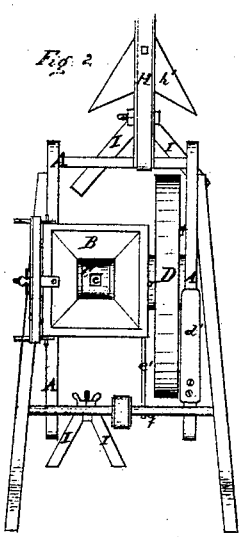 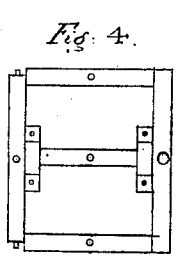 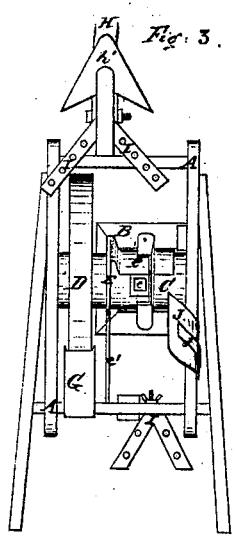
Witnesses:
J. C. McCreery
W. J. Willey
Inventor:
George W. Lewis
by Garrett Davis
his Attorney

United States Patent Office.

GEORGE W. LEWIS, OF WINCHESTER, KENTUCKY.

Letters Patent No. 113,717, dated April 11, 1871.

IMPROVEMENT IN CORN-PLANTERS.

The Schedule referred to in these Letters Patent and making part of the same.

I, GEORGE W. LEWIS, of Winchester, in the county of Clarke and State of Kentucky, have invented certain Improvements in Corn-Planters, of which the following is a specification.

The nature of the improvements in this implement relates to its general construction.

In the accompanying drawing—

Figure 1 is a vertical section.
Figure 2 is a top plan.
Figure 3 is an under-side view.
Figure 4 is a view of seed hopper-lid.

A represents a rectangular frame supporting a hopper, B, and below it the seed-cylinder and axle C, provided with suitable chambers $c$, of which two are shown directly opposite each other.

D is the driving-wheel placed on the end of the cylinder C, which it revolves.

$f$ is a rod attached to the right side of the frame A, in the rear, and extending from a level with the handles to a point near the lower part of the frame A, where it controls a bolt, which it is made to force into circular openings, two of which are placed opposite each other in the driving-wheel D for the purpose of preventing the deposit of seed, when so desired, by arresting the motion of said driving-wheel D.

G is a cleaner, consisting of a flanged plate attached to the end of the frame, and thence reaching diagonally toward the periphery of the wheel D, removing the accumulated obstructions therefrom as it revolves.

H is the draft-hook, an extension of which is connected to the frame A by a bolt in such manner as to be raised or lowered at pleasure, $h$ having a suitable shovel, $h'$, attached to the under and front part of the frame A by one central bar, $h''$, and two side bars, $h'''$ $h''''$, which, after their connection with the frame A, diverge therefrom, and have harrow-teeth fixed in them for turning obstructions from the driving-wheel and coverer.

J is a small plow situated near the front end of the implement just behind the shovel, the beam $j$ being attached to the side of the frame A.

K K are markers attached to the face of the driving-wheel D, near its periphery, and projecting beyond the same, for the purpose of marking the position of each hill.

L is a funnel-shaped tube attached to the lower part of the hopper B, for the purpose of conducting the seed to a point just behind the shovel and in advance of the coverer.

I claim as my invention—

1. The harrow, as made in the divergent bars $h''' h''''$, that connect the shovels $h'$ to the frame A, for turning all obstructions out of the way of the driving-wheel and coverer.

2. The rod controlling the bolt, to check the deposit of the seed at pleasure.

3. The arrangement of the points $n$ the top of the hopper for squaring the field and pointing out the first hill in each row.

4. The device and arrangement by which the plow or shovel, the harrow continuous therewith, the driving-wheel, the cylinder provided with suitable chambers, the markers, the rods and bolt, the points on the top of the hopper, the cleaner, and the funnel-shaped tube, are all combined and arranged in one comparatively light machine, easily managed by one person, and made subservient to the purposes hereinbefore named, the object of the whole being the rapid planting of corn in straight rows, at right angles and at proper distances apart.

GEORGE W. LEWIS.

Witnesses:
RICHARD REID,
I. D. REID.